(12) United States Patent
Zverev et al.

(10) Patent No.: US 6,999,325 B2
(45) Date of Patent: Feb. 14, 2006

(54) CURRENT/VOLTAGE CONVERTER ARRANGEMENT

(75) Inventors: Ilia Zverev, München (DE); Juergen Petzoldt, Ilmenau (DE); Marko Scherf, Rudolstadt (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/766,292

(22) Filed: Jan. 28, 2004

(65) Prior Publication Data

US 2005/0036339 A1    Feb. 17, 2005

(30) Foreign Application Priority Data

Jan. 29, 2003   (DE)   ................. 103 03 421

(51) Int. Cl.
*H02M 3/335*   (2006.01)
(52) U.S. Cl. ................. 363/21.12; 363/21.14; 363/25
(58) Field of Classification Search ............. 363/21.12, 363/21.14, 24, 25, 26, 56.08
See application file for complete search history.

(56) References Cited

U.S. PATENT DOCUMENTS 5,410,467 A * 4/1995 Smith et al. ................. 363/131
6,618,274 B1 * 9/2003 Boylan et al. ................. 363/17
6,807,069 B1 * 10/2004 Nieminen et al. ............. 363/17

* cited by examiner

*Primary Examiner*—Bao Q. Vu
(74) *Attorney, Agent, or Firm*—Maginot Moore & Beck

(57) ABSTRACT

A current/voltage converter arrangement is proposed, in which a first switch device (T1) with a first diode (TD1) is provided between a first input terminal (TE1) of a primary side (TP) of a transformer device (T) provided and a first input terminal (E1) of an input region (E), in which a second switch device (T2) with a diode (TD2) is provided between a second input terminal (TE2) of the primary side (TP) and a second input terminal (E2) of the input region (E). The first and the second diode (TD1, TD2) are respectively in parallel with a first switch mechanism (TM1) of the first switch device (T1) and in parallel with a second switch mechanism (TM2) of the second switch device (T2) and formed in such a way that the respective switch mechanism (TM1, TM2) of the switch device (T1, T2) can in each case be bypassed in a controllable manner by means of an electrical conduction path, that the first switch device (T1) and the second switch device (T2) are formed in antiseries with respect to one another, and that the first switch device (T1) and the second switch device (T2) can be switched on and/or off in a controlled manner, in a clocked manner with a comparatively high or higher switching frequency (vsw) with respect to the input frequency (vin), and in an alternative manner with respect to one another.

22 Claims, 7 Drawing Sheets

CURRENT/VOLTAGE CONVERTER ARRANGEMENT

FIELD OF THE INVENTION

The present invention relates to a current/voltage converter arrangement, and more particularly, a switched-mode power supply.

BACKGROUND

A multiplicity of apparatus used both in industry and private households, or generally consumers of electrical energy, use not only the traditional mains voltage with a mains frequency of 50 Hz but also, increasingly, further voltages and currents with other frequencies which are adapted to the respective applications. Accordingly, electrical adaptations from the mains voltage with the mains frequency of 50 Hz which is provided by the mains have to be carried out for the corresponding electrical consumers. Current/voltage converter arrangements are usually used in such adaptation operations. In particular, switched-mode power supplies are also used in this case. Customary components of such current/voltage converter arrangements and in particular of switched-mode power supplies are rectifiers, transformers, storage capacitors, smoothing inductors and similar structural components.

Known current/voltage converter arrangements, in particular for switched-mode power supplies, are usually formed by a current/voltage input region, a current/voltage output region and a transformer device provided in between. The current/voltage input region has first and second input terminals which serve for taking up a primary AC current or primary current and/or a primary AC voltage or primary voltage, the primary current or the primary voltage being modulated in particular with a specific input frequency, for example of 50 Hz. The current/voltage output region serves to provide and/or output a secondary current and/or a secondary voltage which, in particular, is converted with respect to the primary current and/or the primary voltage. The conversion itself is realized by the transformer device provided. The latter thus serves for the current/voltage conversion and has a primary side having a primary inductance with a first and a second input terminal. Furthermore, the transformer device has a secondary side having an inductive secondary inductance coupled to the primary inductance.

In known complete systems for current/voltage conversion, it is necessary, moreover, to provide further components by means of which, in particular, a power adaptation is also effected. Furthermore, specific rectifier components are necessary. All these components have and realize specific power losses.

SUMMARY

The invention is based on the object of specifying a current/voltage converter arrangement which can realize a current/voltage conversion with particularly low power losses in a particularly simple yet reliable manner.

In the case of a current/voltage converter arrangement of the type mentioned in the introduction, the object is achieved according to the invention by means of the characterizing features of the independent claim 1. The dependent subclaims respectively relate to advantageous developments of the current/voltage converter arrangement according to the invention.

The current/voltage converter arrangement according to the invention is characterized by the fact that a first switch device with a first—in particular essentially unidirectional—bypass function is provided between the first input terminal of the primary side of the transformer device and the first input terminal of the current/voltage input region, a second switch device with a second—in particular essentially unidirectional—bypass function is provided between the second input terminal of the primary side of the transformer device and the second input terminal of the current/voltage input region, the first bypass function and the second bypass function are respectively in parallel with a first switch mechanism of the first switch device and in parallel with a second switch mechanism of the second switch device and formed and/or arranged in such a way that the respective switch mechanism of the respective switch device can be bypassed in each case in a controllable manner with an electrical conduction path. It is furthermore provided that the first switch device and the second switch device are formed in antiseries with respect to one another, and the first switch device and the second switch device can be switched on and/or off in a controlled manner, in a manner dependent on the primary potential and/or on the primary current, in a clocked manner with a comparatively high or higher switching frequency with respect to the input frequency, and in an alternative manner with respect to one another.

By means of the features provided according to the invention, in the case of a current/voltage converter arrangement according to the present invention, the number of components affected by critical power losses is critically reduced compared with the prior art, but at the same time a reliable current/voltage conversion with power factor adaptation and/or, if appropriate, rectification can be realized.

Thus, a central idea of the present invention is to provide a respective switch device instead of an explicit rectifier device on the input side or primary side of the transformer and instead of a corresponding power factor adaptation circuit between the primary side of the transformer device and the input for the mains voltage, with the result that a serial sequence comprising first switch device, primary inductance of the transformer device and second switch device is produced, the first switch device and the second switch device in each case additionally having a bypass function and being formed in antiseries with respect to one another. The first switch device and the second switch device can be switched on and/or off in an alternative manner with respect to one another, use being made of a high or higher switching frequency in comparison with the input frequency of the primary current or the primary voltage. Furthermore, a controlled, mutually alternative switch-on and/or -off which is dependent on the primary potential and/or on the primary current is produced for the two switch devices. Consequently, as viewed overall, a current/voltage conversion with at the same time rectification and power factor adaptation is realized, to be precise without having to use the multiplicity of lossy components known in the prior art.

In a preferred embodiment of the current/voltage converter arrangement according to the invention, it is provided that the first switch mechanism and the first bypass function of the first switch device are respectively formed in antiseries with respect to the second switch mechanism and with respect to the second bypass function of the second switch device. The antiseries arrangement of the first and second switch devices with respect to one another is realized in this way.

In a further advantageous embodiment of the current/voltage converter arrangement according to the invention, the first switch mechanism and/or the second switch mechanism are formed as a bipolar transistor or an IGBT.

The first and/or the second bypass function has to be additionally and explicitly formed, in particular as a diode device.

It is particularly advantageous, however, if the first and/or the second switch mechanism are formed as MOSFET.

It is particularly advantageous in particular when, but also in other cases, the first bypass function and/or the second bypass function are formed as a parasitic diode device and in particular as a parasitic body diode. This is because the bypass function can then be formed inherently without the explicit provision of additional structural parts and solely on account of the nature of, for example, the switch mechanisms or switch devices provided.

The current/voltage converter arrangement according to the invention is configured in a particularly advantageous manner if the first and the second switch device can be connected or are connected directly to the primary voltage. The input and rectifier stages provided in the case of the prior art are thereby obviated.

As an alternative or in addition, it is provided that the first and the second switch device in interaction form a synchronous rectifier or can be operated or are operated as such. This measure also obviates the lossy explicit rectifier device provided in the case of the prior art on the primary side of the transformer device.

In this case, but also otherwise, it is provided, in particular, that the first and the second bypass function are formed and/or arranged in such a way that in interaction they can be operated or are operated as a primary-side rectifier device.

The transformer device can be used particularly effectively as an energy store, according to the invention, when the transformer device is constructed and arranged and can be operated and/or is operated essentially in accordance with the flyback converter principle.

Various configurational forms are afforded with regard to the transformer device.

In accordance with one preferred embodiment, it is provided that the secondary inductance is formed by an individual inductance. As an alternative, it may be provided that the secondary inductance is formed by a first secondary inductance in a second secondary inductance.

In accordance with a further preferred embodiment of the current/voltage converter arrangement according to the invention, it is provided that a secondary-side rectifier device is provided between the secondary inductance and the current/voltage output region.

In this case, various embodiments are again afforded for the secondary or secondary-side rectifier device.

In a preferred embodiment, the secondary-side rectifier device is formed as an arrangement of diode devices.

In addition, or as an alternative, it is provided that the secondary-side rectifier device is formed as a rectifier half-bridge with two diode devices, particularly if the secondary inductance is formed as an individual inductance.

In another alternative embodiment of the invention, it is provided that the secondary or secondary-side rectifier device is formed as a rectifier full bridge with four diode devices, in particular when the secondary inductance is formed by a first secondary inductance and a second secondary inductance.

It is particularly advantageous if the diode devices of the secondary-side rectifier device are formed by MOSFETs.

In this case, it is particularly advantageous if the secondary-side rectifier device can be operated or is operated in the synchronous rectifier mode.

In another alternative embodiment of the present invention, it is provided that a capacitor device for smoothing and/or for energy storage is provided between the current/voltage output region and the secondary-side rectifier device in parallel with first and with second output terminals of the current/voltage output region.

In this case, it is particularly preferred that a serial isolating device is provided between the capacitor device and the secondary-side rectifier device, and that this serial isolating device is formed to prevent and/or to suppress, in a controlled manner in a manner that is potential-dependent and/or phase-dependent on the primary current and/or on the primary voltage, a direct application of the primary voltage to the capacitor device.

In this case, it is advantageously provided that the serial isolating device has a switch device or is formed as such.

It is particularly advantageous if, in accordance with a further advantageous embodiment of the present invention, the serial isolating device has a MOSFET or is formed as such.

In addition or as an alternative, it may be provided that the serial isolating device is inversely clocked and/or inversely controlled or inversely clockable and/or inversely controllable with respect to the first and with respect to the second switch device.

These and further aspects of the present invention are also explained in more detail on the basis of the remarks below:

An ever increasing proportion of the electrical energy consumers in a household no longer requires the traditional form of electrical energy with a 50 Hz sinusoidal voltage, but rather requires voltages, currents and frequencies which are adapted to the respective process.

This adaptation currently uses rectifiers, transformers, switched-mode power supplies, storage capacitors and smoothing inductors which, from the mains connection point up to the consumer, form a plurality of cascaded energy conversion and storage stages. During the flow of energy, losses arise in each stage, so that the maximum efficiency that can be achieved decreases as the number of stages increases.

This situation was aggravated further by the legislator through the introduction of the new EU standard EN61000-3-2 for power factor correction PFC, because an additional energy conversion stage becomes necessary.

In accordance with the present-day prior art, mains connection assemblies comprise a filter circuit, a rectifier with downstream-connected step-converter, intermediate circuit capacitors, invertor, inductive transformer, rectifier, smoothing inductor and filter. These energy conversion and storage stages are necessary in order to generate an adjustable DC voltage from the AC input voltage.

In this configuration, a maximum efficiency limit of nowadays on average 72% can be achieved on account of the various energy conversion stages.

A study of PC power supplies showed that the use of the best power semiconductors in a conventional system enables the power loss to be reduced in such a way as to make it possible to dispense with heat sinks and fans. At the same time, this study proved that a further reduction of the power loss is not possible through a further optimization of components, but only through a new architecture.

The typical input architecture nowadays comprises e.g. a diode bridge for the rectification of the mains voltage and a downstream-connected boost converter for the power factor correction.

The power loss of the diode bridge is a significant portion of the total losses in the system. Said diode bridge often has to be cooled by means of a heat sink.

The number of components is increased by the present-day input architecture, thus reducing the reliability of the system.

A further problem resides in the surge current problem area when the switched-load power supply is first switched on. Before the power supply is switched on, all the energy stores such as inductances and capacitors are empty. When the power supply is switched on, the mains voltage is abruptly connected to the system. This leads to very large current surges during the charging of the capacitors. Said current surges may destroy components, principally the semiconductors.

The solution proposed according to the invention comprises, inter alia, a novel converter with the functions of present-day mains rectifiers and power factor correctors or PFC boost.

A number of central aspects of the invention are characterized by the fact that two primary-side switch devices or switches, without rectifiers or a diode bridge, are connected directly to the mains or to the primary voltage, that these two primary-side switch devices are connected in antiseries with respect to one another and in series with the primary-side inductance or winding of the transformer or the transformer device, and that, in particular, one or a plurality of secondary-side switch devices provide for the electrical isolation of an output capacitor as long as current flows through the primary-side inductance or winding of the transformer device.

The present invention is explained in more detail below on the basis of preferred embodiments with reference to the accompanying drawings.

BRIEF DESCRIPTION OF THE INVENTION

FIG. 1, 2 diagrammatically show circuit arrangements which are used in the area of current/voltage conversion in the case of the prior art.

FIG. 3 shows a circuit arrangement of a first embodiment of the current/voltage converter arrangement according to the invention.

FIG. 4A-5B diagrammatically elucidate the functioning of the current/voltage converter arrangement according to the invention as shown in FIG. 3.

DETAILED DESCRIPTION

In the case of the figures and embodiments described below, structurally and/or functionally identical or similar elements or assemblies are designated by the same reference symbols. A detailed description in respect thereof is not repeated every time they occur.

Figure 3:
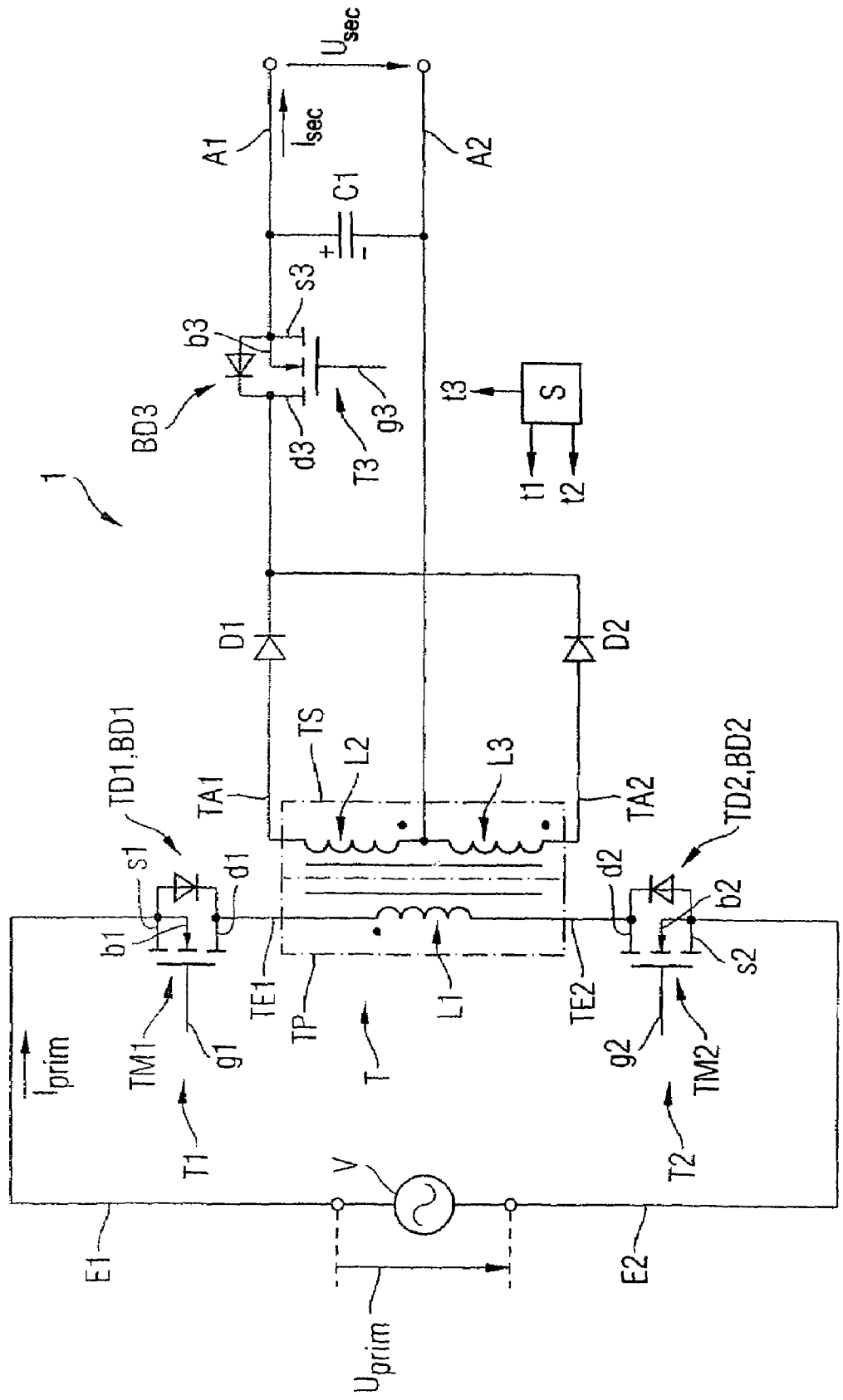

One embodiment of the circuit arrangement for the current/voltage converter arrangement 1 according to the invention with the proposed "Reverse-Blocking Flyback" is illustrated in FIG. 3.

It comprises a transformer device T with a primary side TP and a secondary side TS, a current/voltage input region E for connecting the primary side TP to the mains V1 and a current/voltage output region for connecting the secondary side TS to a load or the like.

The current/voltage input region E has a first input terminal E1 and a second input terminal E2. The current/voltage output region A has a first output terminal A1 and a second output terminal A2.

The primary side TP of the transformer device T also has first and second input terminals TE1 and TE2. A first switch device T1 is provided between the first input terminal TE1 of the primary side TP of the transformer device T and the first input terminal E1 of the current/voltage input region E. A second switch device T2 is provided between the second input terminal TE2 of the primary side TP of the transformer device T and the second input terminal E2 of the current/voltage input region E.

The first switch device T1 is formed by a first switch element TM1 or switch mechanism TM1 in the form of a MOSFET and by the body diode BD1 inherent therewith as first essentially unidirectional bypass function TD1, by means of which it is possible to realize an electrically conductive bypass path for bypassing the first switch mechanism TM1 in a controllable manner. The second switch device T2 is formed by a second switch element TM1 or switch mechanism TM1 in the form of a MOSFET and by the body diode BD2 inherent therewith as second essentially unidirectional bypass function TD2, by means of which it is possible to realize an electrically conductive bypass path for bypassing the first switch mechanism TM2 in a controllable manner.

The first switch mechanism TM1 has, as a MOSFET, a first source terminal or source region s1, a first drain terminal or drain region d1, a first body terminal or body region b1 and also a first gate terminal or gate region g1.

The second switch mechanism TM2 has, as a MOSFET, a second source terminal or source region s2, a second drain terminal or drain region d2, a second body terminal or body region b2 and also a second gate terminal or gate region g1.

The first switch device T1 and the second switch device T2 and consequently the first switch mechanism TM1 and the first bypass function TD1, on the one hand, and the second switch mechanism TM2 and the second bypass function TD2, on the other hand, are formed in antiseries with respect to one another.

The primary AC voltage or primary voltage Uprim and/or the primary AC current or primary current Iprim of the mains V1 can be fed to the primary side TP via the current/voltage terminals E1 and E2 of the current/voltage input region E.

The transformer device T has a primary inductance L1 on the primary side TP and a secondary inductance comprising a first and a second secondary inductance L1 and L2, respectively, on the secondary side. The secondary inductance as a whole has first and second output terminals TA1 and TA2, respectively.

The antiseries-connected switch devices T1 and T2 or MOSFETs T1, T2 with parasitic body diodes BD1 and BD2 as bypass functions TD1 and TD2 are directly connected to the mains V1 and thus to the primary AC voltage or primary voltage Uprim. In this case, the pure MOSFETs—without the parasitic body diodes BD1, BD2—form the switching elements or switching mechanisms TM1, TM2 in the sense of the invention. The separate mains rectifier from the prior art is completely obviated, and thus so are the power losses in respect thereof.

For outputting power to an external load, a current/voltage output region A with first and second output terminals A1 and A2, respectively, is provided on the secondary side.

For energy storage and/or for smoothing, a capacitor device C1 is provided in a manner connected in parallel between the secondary side TS of the transformer device T and the current/voltage output terminals A1 and A2.

A secondary-side rectifier device G2, which is formed by a half-bridge arrangement comprising two diodes D1, D2, is provided between the capacitor device C1 and the secondary side TS of the transformer device T.

Furthermore, an isolating device T3—which can be clocked in a controlled manner—in the form of a MOSFET with body diode BD3 is provided in series between the first current/voltage output terminal A1 and the first output terminal TA1 of the secondary side TS of the transformer device T or the secondary-side rectifier device. The MOSFET T3 likewise has a drain region or drain terminal d3, a source region or source terminal s3, a body region or body terminal b3 and also a gate region or gate terminal g3.

For controlling the first and second switch devices T1, T2 and the isolating device T3, provision is made of a control device S with control terminals t1, t2, t3 for the transistors T1, T2 and T3, respectively, or for the gate terminals g1, g2 and g3, respectively, thereof.

The basic functioning of the current/voltage converter arrangement 1 according to the invention in accordance with FIG. 3 is explained with reference to FIG. 4A to 5B.

Figure 4A:
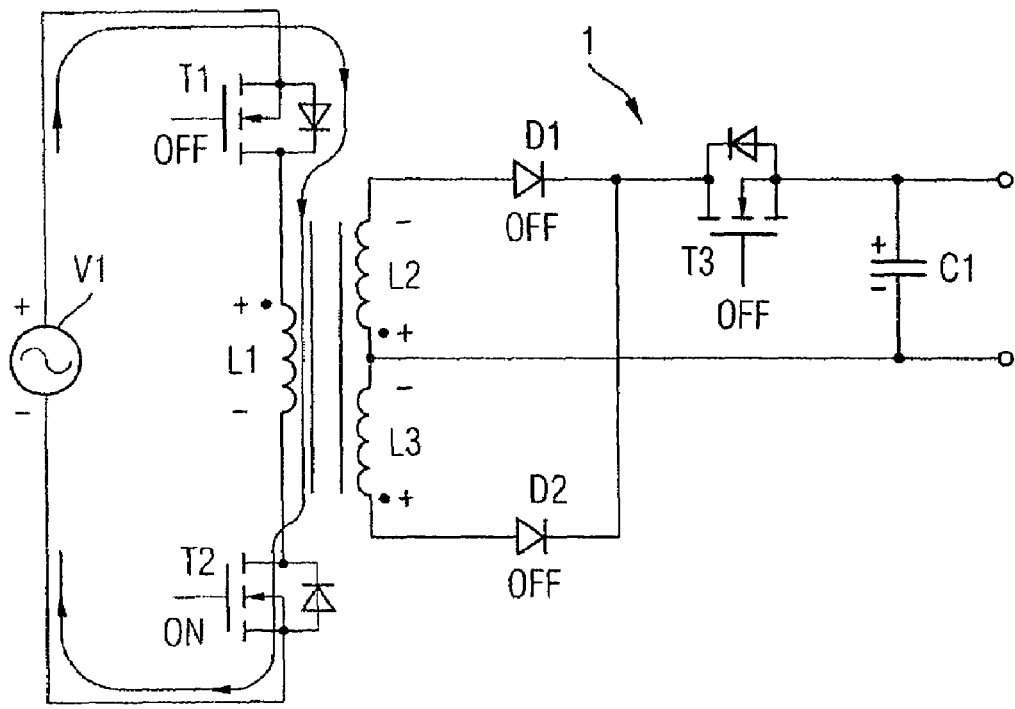

The second switch device T2 or the second MOSFET T2 is switched on, as is shown in FIG. 4A, if the positive half-phase of the primary voltage Uprim of the mains V1 is present at the first input terminal E1. The primary AC current Iprim or primary current Iprim flows in the current/voltage input region E from the mains V1 via the body diode BD1 of the first switch device T1 or of the first MOSFET T1 into the primary inductance L1 or primary winding L1 of the transformer T and via the channel of the second switch device T2 back to the mains V1.

On the side of the secondary side TS of the transformer device, the transistor T3 remains switched off. As a result, no current flow can arise on the secondary side. The transformer T with the primary inductance L1 and the secondary inductances L2, L3 stores magnetic energy.

Figure 4B:
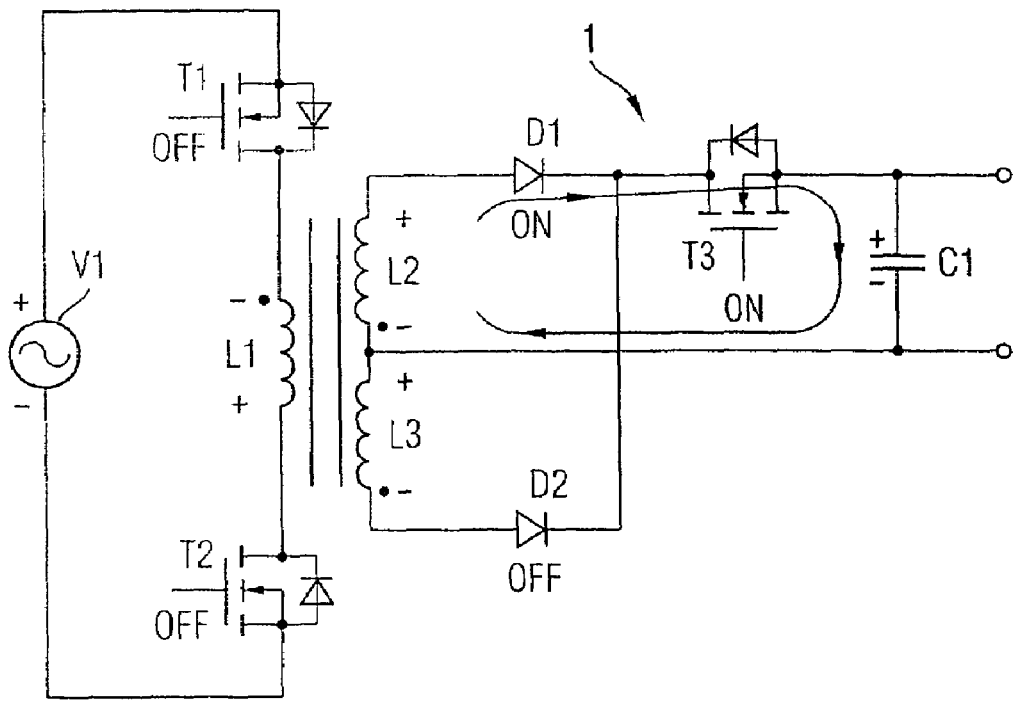

The transistor T2 is switched off, as is shown in FIG. 4B. The transformer windings L1, L2, L3 change their polarity on account of the law of induction. The transistor T3 is switched on. The diode D1 is positively biased, as a result of which a current flow of the secondary current Isec arises from the secondary side TS, to be precise from the winding L2 via the diode D1 and the channel of T3 to the capacitor C1 and back to the other end of the winding L2. The transformer T outputs the stored energy into the load and the capacitor C1.

Figure 5A:
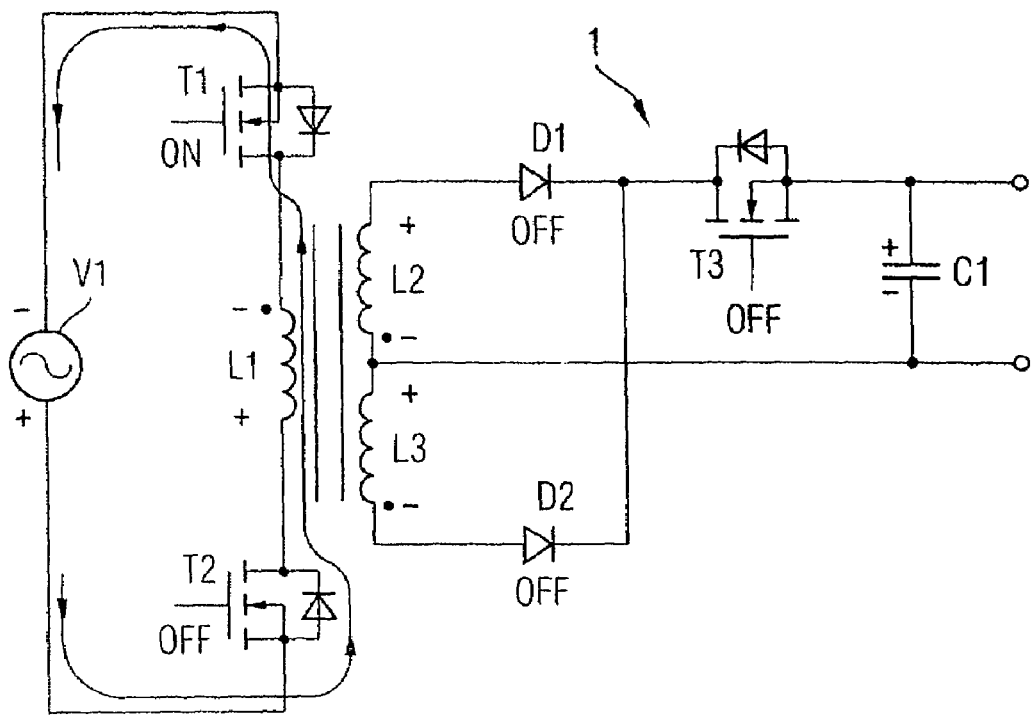

During the negative half-cycle or half-phase at the first input terminal E1, the transistor T1 is switched on, as is shown in FIG. 5A. The primary current Iprim flows from the mains V1 via the body diode BD2 of T2 into the primary winding L1 of the transformer T and via the channel of T1 back to the mains V1.

On the secondary side TS, the transistor T3 remains switched off. As a result, no current flow of the secondary current Isec can arise on the secondary side TS. The transformer T stores magnetic energy.

Figure 5B:
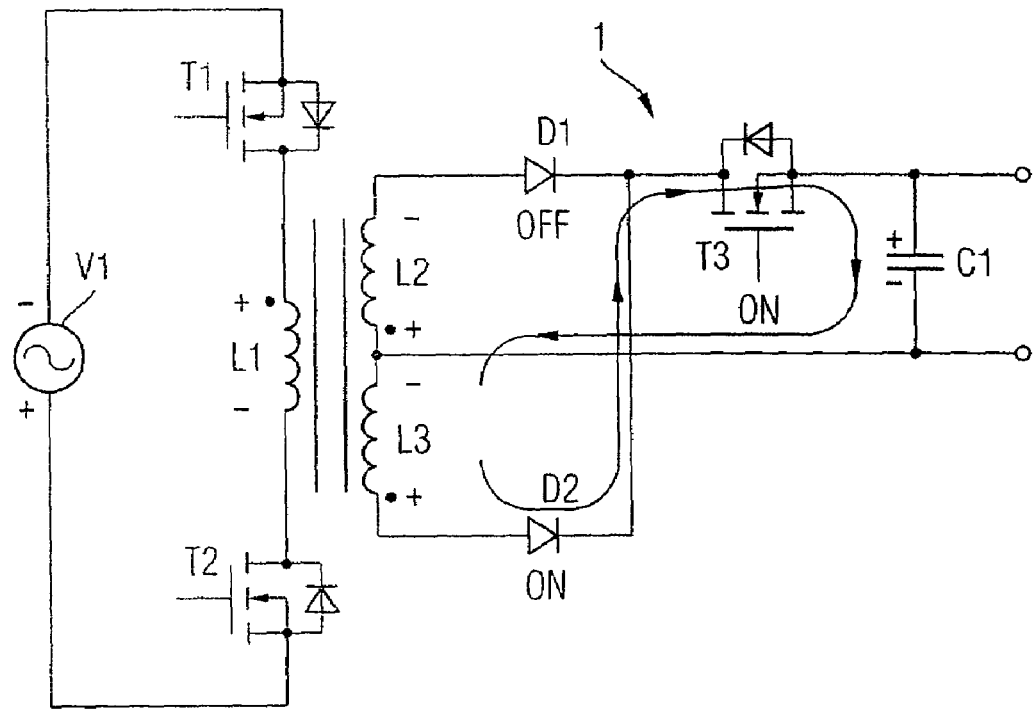

The transistor T1 is then switched off, as is shown in FIG. 5B. The transformer windings L1, L2, L3 change their polarity on account of the law of induction. The transistor T3 is switched on in a controlled manner. The diode D2 is positively biased, as a result of which a current flow of the secondary current Isec arises on the secondary side TS, to be precise from the winding L3 via the diode D2 and the channel of T3 to the capacitor C1 and back to the other end of the winding L3. The transformer T outputs the stored energy into the load and the capacitor C1.

The power factor correction is realized by pulse width modulation or by frequency modulation or by both. The rectification and PFC are realized in this way.

Figure 6:
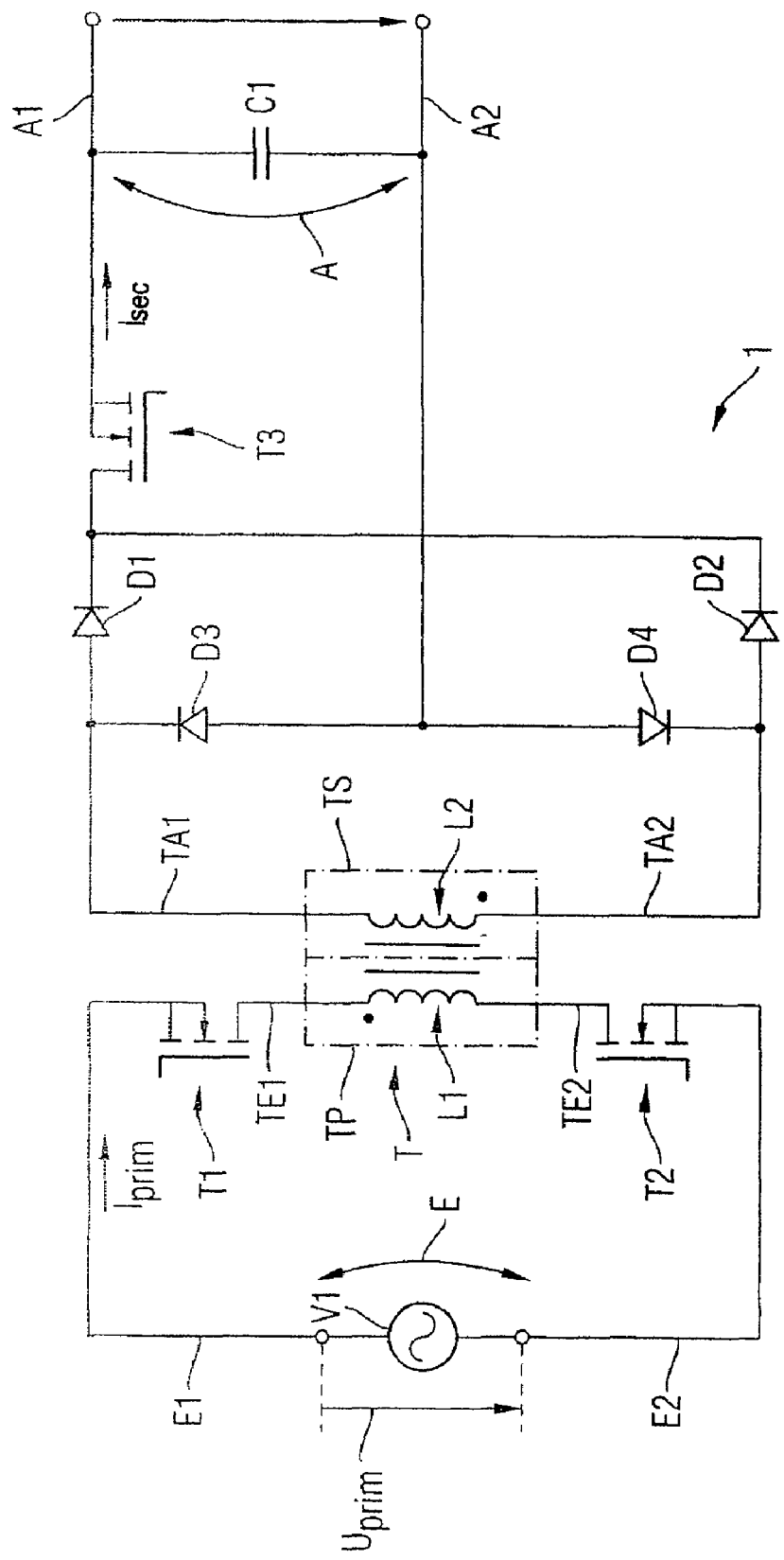
FIG. 6 shows an alternative embodiment of the current/voltage converter arrangement according to the invention.

FIG. 6 shows another embodiment of the current/voltage converter arrangement 1 according to the invention. In the case thereof, the secondary inductance L2 of the transformer device T is an individual inductance or individual winding. The secondary-side rectifier device G2 is a rectifier full bridge comprising four diodes D1, D2, D3, D4.

If the switches T1, T2 are designed as MOSFETs, they can be operated as a synchronous rectifier. If the respective body diode BD1, BD2 is intended to conduct, the respective channel of the respective MOSFET TM1, TM2 is opened by the respective gate g1, g2. As a result, the current Iprim is divided between the body diode BD1, BD2 and the channel. This leads to a low power loss caused by the Reverse-Recovery behavior of the respective body diode BD1, BD2, since a smaller current flows and has to commutate in said body diode.

If the channel resistance has a smaller value than the body diode forward voltage divided by flowing current, the entire current flows only through the channel of the MOSFET. This leads to an even lower power loss during the commutation of the body diode, which is obviated in this case.

The MOSFETs T1 and T2 can be operated in the synchronous rectifier mode.

The diodes D1 and D2 of the secondary-side rectifier device may be designed as MOSFETs in the synchronous rectifier mode.

If said diodes D1 and D2 are designed as MOSFETs, a transistor T3 or an isolating device T3 may be obviated, under certain circumstances, if isolation is then inherently effected by D1 and D2.

If the primary-side switches T1, T2 are designed as MOSFETs, they may be operated as synchronous rectifiers. If the respective body diode BD1, BD2 is intended to conduct, the channel of the respective MOSFET TM1, TM2 is opened by the respective gate g1, g2. As a result, the current Iprim is divided between the body diode BD1 or BD2, respectively, and the channel. This leads to a low power loss caused by the reverse recovery behavior of the respective body diode BD1 or BD2, since a smaller current flows and has to commute in said body diode.

If the channel resistance has a lower value than the quotient of forward voltage dropped across the body diode divided by flowing current, the entire current flows only through the channel of the respective MOSFET TM1, TM2. This leads to an even lower power loss during the commutation of the respective body diode BD1 or BD2, which is obviated in this case.

The primary-side MOSFETs TM1, TM2 may, under certain circumstances, be operated in the synchronous rectifier mode.

All the secondary-side diodes D1, D2, D3, D4 may likewise be designed as MOSFETs in the synchronous rectifier mode.

If the secondary-side diodes D1, D2, D3, D4 are designed as MOSFETs, then no secondary-side transistor T3 is required, under certain circumstances.

Advantages of the solutions proposed are:
reduced number of components in the system,
higher reliability on account of fewer components,
lower costs on account of fewer components, and
higher efficiency together with little power loss.

Figure 7:
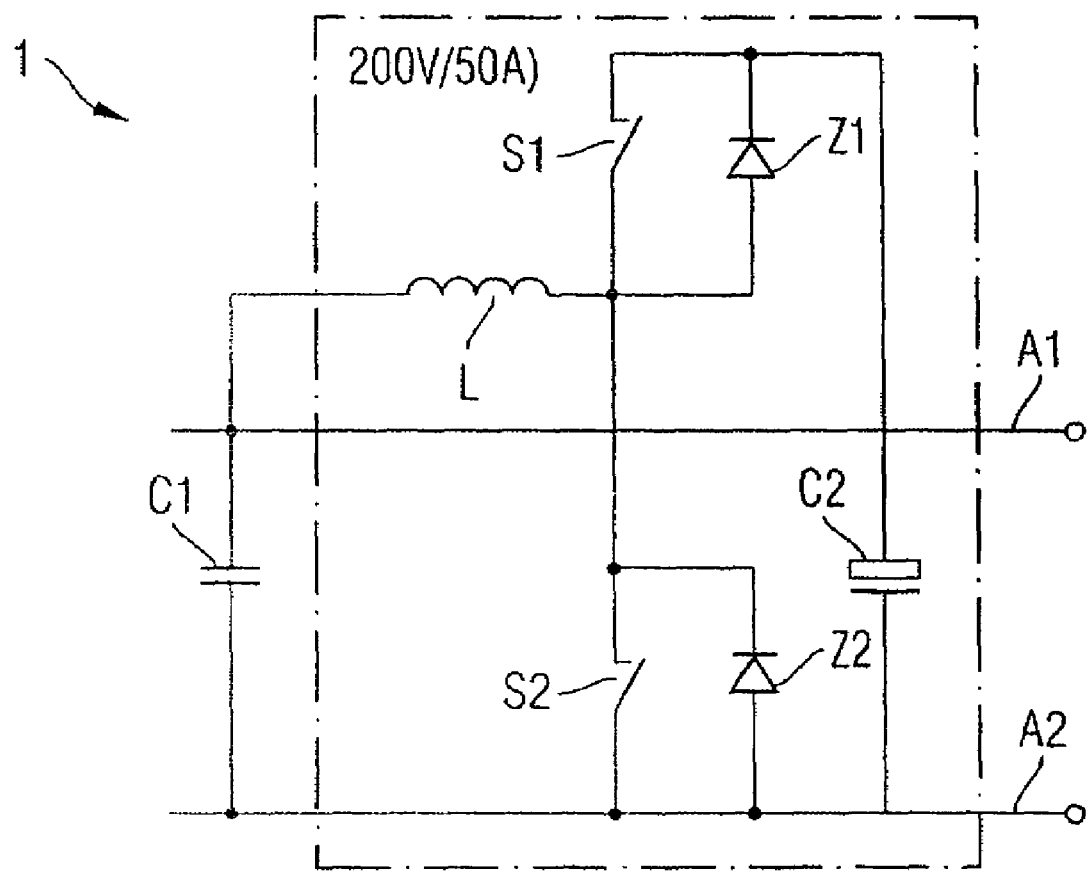
FIG. 7 shows a detail of another embodiment of the current/voltage converter arrangement according to the invention.

What may be disadvantageous, under certain circumstances, is a 100 Hz/120 Hz voltage ripple at the output capacitor C1 at relatively low output voltages (<100 V). This disadvantage can be eliminated by using a low-power active filter, as is shown in FIG. 7.

The energy absent during the mains zero crossings is drawn from the capacitor C2 and pumped into the output capacitor C1. C2 is charged via the inductor L and the switches S1 and S2 if there is enough energy from the mains.

Figure 1:
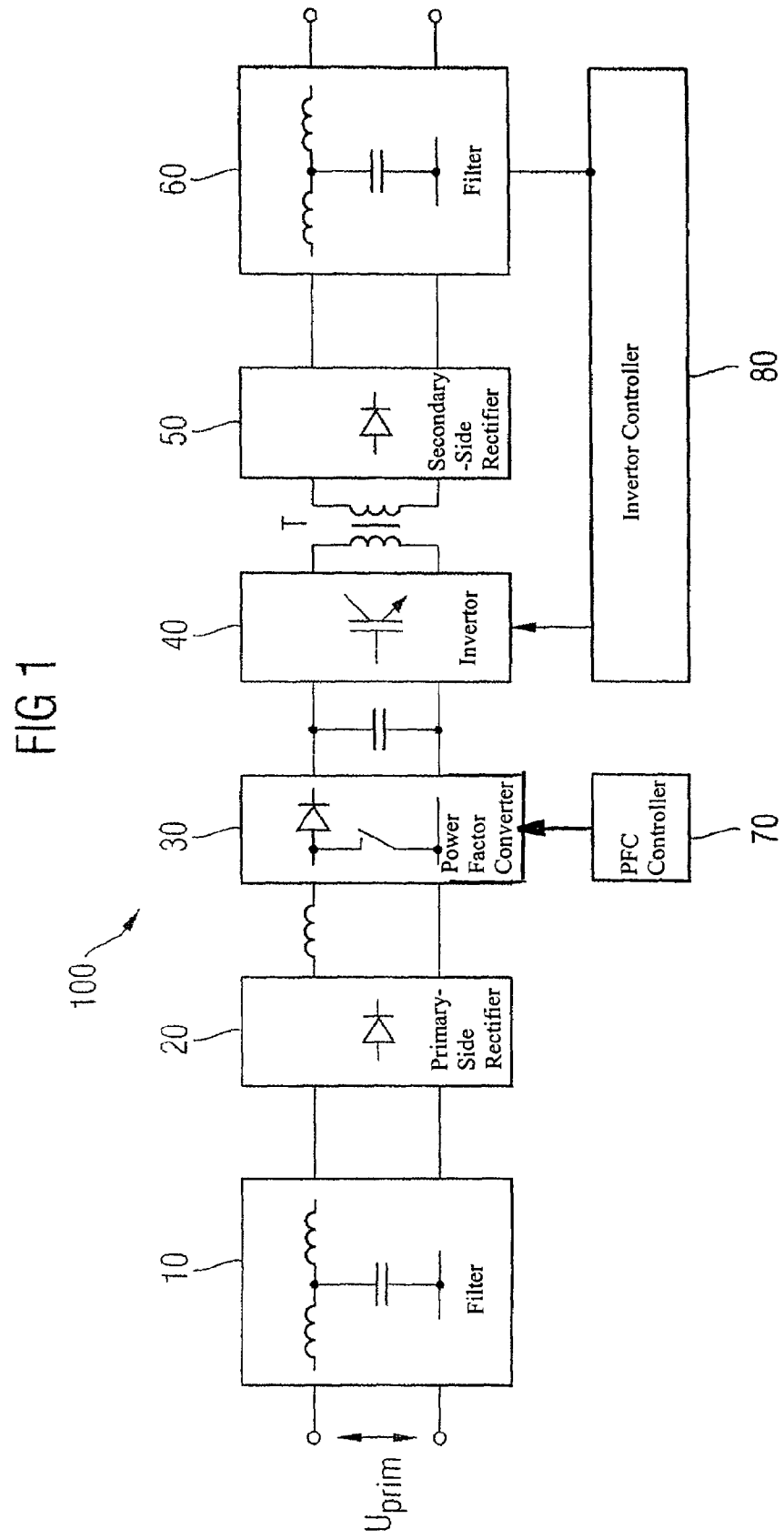
Figure 2:
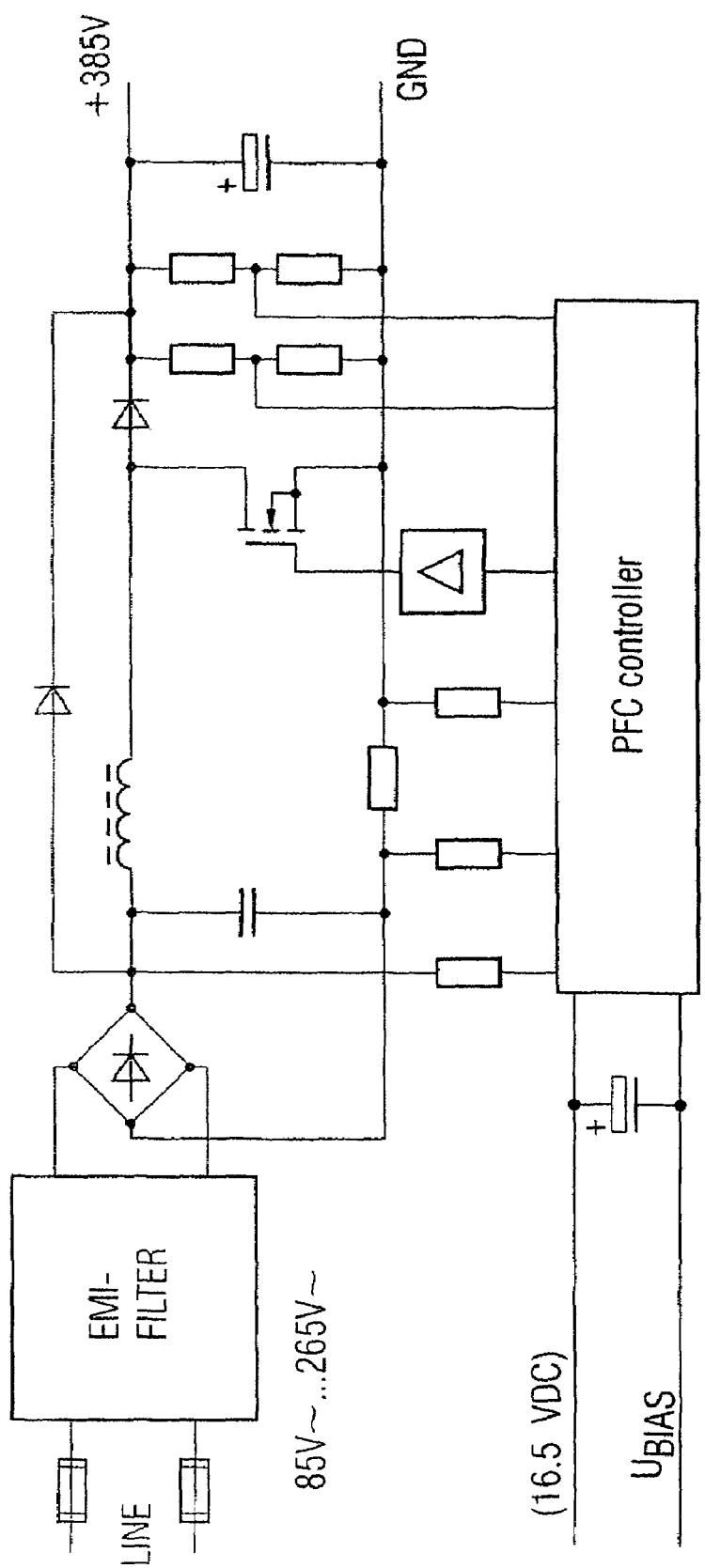

According to the invention, the transformer device T additionally forms the function of the inductor between the primary-side rectifier 20 and the PFC 30 of the known converter arrangement 100 from FIG. 1.

In addition to the secondary-side rectification, the secondary-side diodes D1, D2, D3, D4 also partially or completely perform the function of the PFC diodes provided in the case of the prior art.

LIST OF REFERENCE SYMBOLS

1 Current/voltage converter arrangement according to the invention
10 Filter, mains filter
20 Primary-side rectifier
30 Power factor converter, PFC
40 Invertor
50 Secondary-side rectifier
60 Filter
70 PFC controller
80 Invertor controller
100 Conventional current/voltage converter arrangement
A1 Current/voltage output terminal, output terminal
A2 Current/voltage output terminal, output terminal
BD1 Body diode
BD2 Body diode
BD3 Body diode
B1 Body terminal with respect to T1
B2 Body terminal with respect to T2
B3 Body terminal with respect to T3
C1 Capacitor device, smoothing capacitor, capacitor for energy storage
C2 Capacitor
D1 Diode device
D2 Diode device
D3 Diode device
D4 Diode device
D1 Drain terminal with respect to T1
D2 Drain terminal with respect to T2
D3 Drain terminal with respect to T3
E1 Current/voltage input terminal, input terminal
E2 Current/voltage input terminal, input terminal
G2 Secondary-side rectifier device
G1 Gate terminal with respect to T1
G2 Gate terminal with respect to T2
G3 Gate terminal with respect to T3
Iprim Primary ac current, primary current
Isec Secondary current
L Inductor
L1 Primary inductance
L2 Secondary inductance, first secondary inductance,
L3 Secondary inductance, second secondary inductance
S control device for T1, T2, T3
S1 Source terminal with respect to t1
S2 Source terminal with respect to T2
S3 Source terminal with respect to T3
T Transformer device, transformer
T1 Switch device, first switch device
T2 Switch device, second switch device
T3 Isolating device
T1 Control line with respect to T1
T2 Control line with respect to T2
T3 Control line with respect to T3
TD1 First bypass function, first diode with respect to T1
TD2 Second bypass function, second diode with respect to T2
TA1 First output terminal of the secondary side TS
TA2 Second output terminal of the secondary side TS
TE1 First input terminal of the primary side TP
TE2 Second input terminal of the primary side TP
TM1 First switching element
TM2 Second switching element
TP Primary side of the transformer device T
TS Secondary side of the transformer device T
Uprim Primary ac voltage, primary voltage
Usec Secondary voltage
V1 Mains voltage, mains voltage source
Z1 Diode
Z2 Diode
vin Input frequency
vsw Switching frequency

What is claimed is:

1. A current/voltage converter arrangement comprising:
   first and second input terminals configured to receive a primary AC signal having an input frequency;
   an output region;
   a transformer device having a primary side and a secondary side, the primary side having a primary inductance and first and second primary terminals, the secondary side having a secondary inductance;
   a first switch device coupled between the first input terminal and the first primary terminal, the first switch device having an off condition and an on condition, the first switch configured to conduct current in a first direction in the on condition;
   a second switch device coupled between the second input terminal and second primary terminal, the second switch device having an off condition and an on condition, the second switch configured to conduct current in a second direction in the on condition;
   a first bypass coupled in parallel with the first switch device, and a second bypass coupled in parallel with the second switch device, the first bypass operable to conduct current when the first switch is in an off condition, the second bypass operable to conduct current when the second switch is in an off condition;
   wherein the first switch device, the primary inductance of the transformer device, and the second switch device are connected in a serial sequence, and wherein the first switch device and the second switch device are provided in antiseries with respect to one another.

2. The current/voltage converter arrangement as claimed in claim 1, wherein
   the first switch device is configured to switch to the on condition when the second switch device is in the off condition, the second switch device is configured to switch to the on condition when the first switch device is in the off condition, the first switch device having a switching frequency dependent upon an aspect of the primary AC signal.

3. The current/voltage converter arrangement as claimed in claim 1, wherein the first switch device comprises a bipolar transistor.

4. The current/voltage converter arrangement as claimed in claim 3, wherein the first bypass comprises a separate diode device.

5. The current/voltage converter arrangement as claimed in claim 1, wherein,
the first switch device comprises a MOSFET.

6. The current/voltage converter arrangement as claimed in claim 5, wherein the first bypass comprises a parasitic diode device of the MOSFET.

7. The current/voltage converter arrangement as claimed in claim 1, wherein the first switch device is coupled directly to the first input terminal and the second switch device is coupled directly to the second input terminal.

8. The current/voltage converter arrangement as claimed in claim 1, wherein the first switch device and the second switch device cooperate to form a synchronous rectifier.

9. The current/voltage converter arrangement as claimed in claim 1, wherein the first bypass and the second bypass cooperate to form a primary-side rectifier device.

10. The current/voltage converter arrangement as claimed in claim 1, wherein the secondary inductance comprises multiple taps.

11. The current/voltage converter arrangement as claimed in claim 1, further comprising a secondary-side rectifier device operably coupled to secondary side of the transformer.

12. The current/voltage converter arrangement as claimed in claim 11, wherein the secondary-side rectifier device comprises a plurality of diode devices.

13. The current/voltage converter arrangement as claimed in claim 12, wherein the secondary-side rectifier device comprises a half-bridge rectifier with two diode devices.

14. The current/voltage converter arrangement as claimed in claim 12, wherein the secondary-side rectifier device comprises a full wave diode rectifier bridge.

15. The current/voltage converter arrangement as claimed in claim 12, wherein at least one of the plurality of diode devices of secondary-side rectifier device is formed as a MOSFET.

16. The current/voltage converter arrangement as claimed in claim 15, wherein the at least one MOSFET may be controlled such that the secondary-side rectifier device is operated in a synchronous rectifier mode.

17. A current/voltage converter arrangement comprising:
first and second input terminals configured to receive a primary AC signal having an input frequency;
an output;
a transformer device having a primary side and a secondary side, the primary side having a primary inductance and first and second primary terminals, the secondary side having a secondary inductance;
a first switch device coupled between the first input terminal and the first primary terminal, the first switch device having an off condition and an on condition, the first switch configured to conduct current in a first direction in the on condition;
a second switch device coupled between the second input terminal and second primary terminal, the second switch device having an off condition and an on condition, the second switch configured to conduct current in a second direction in the on condition;
a first bypass coupled in parallel with the first switch device, and a second bypass coupled in parallel with the second switch device, the first bypass operable to conduct current when the first switch is in an off condition, the second bypass operable to conduct current when the second switch is in an off condition,
a third switch coupled between the secondary side of the transformer device and the output, the third switch operable to alternate between an on condition and an off condition synchronous to the on and off conditions of the first and second switch devices.

18. The current/voltage converter arrangement as claimed in claim 17, wherein
the first switch device is configured to switch to the on condition when the second switch device is in the off condition, the second switch device is configured to switch to the on condition when the first switch device is in the off condition, the first switch device having a switching frequency dependent upon an aspect of the primary AC signal, the third switch device also having a switching frequency dependent upon the aspect of the primary AC signal.

19. The current/voltage converter arrangement as claimed in claim 17, further comprising:
a secondary-side rectifier device coupled between the secondary side of the transformer and the output; and
at least one smoothing capacitor coupled between the secondary-side rectifier device and the output.

20. The current/voltage converter arrangement as claimed in claim 19, wherein the third switch device comprises at least a portion of the secondary-side rectifier device.

21. The current/voltage converter arrangement as claimed in claim 17, wherein the third switch device comprises a MOSFET.

22. The current/voltage converter arrangement as claimed in claim 18, wherein third switch device is inversely controlled with respect to the first switch device.

* * * * *